(12) United States Patent
Brondijk

(10) Patent No.: US 7,755,997 B2
(45) Date of Patent: Jul. 13, 2010

(54) METHOD AND DEVICE FOR STORING INFORMATION

(75) Inventor: Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1271 days.

(21) Appl. No.: 10/556,610

(22) PCT Filed: May 12, 2004

(86) PCT No.: PCT/IB2004/050665

§ 371 (c)(1),
(2), (4) Date: Nov. 15, 2005

(87) PCT Pub. No.: WO2004/102569

PCT Pub. Date: Nov. 25, 2004

(65) Prior Publication Data

US 2007/0143524 A1      Jun. 21, 2007

(51) Int. Cl.
*G11B 20/12* (2006.01)
*G11B 7/007* (2006.01)
(52) U.S. Cl. .................. 369/59.25; 369/275.3
(58) Field of Classification Search ... 369/47.14–47.16, 369/47.22, 53.17, 59.25, 275.3
See application file for complete search history.

(56) References Cited

U.S. PATENT DOCUMENTS

| | | | | |
|---|---|---|---|---|
| 5,109,306 A | * | 4/1992 | Mase et al. | 360/77.04 |
| 6,341,109 B1 | * | 1/2002 | Kayanuma | 369/47.14 |
| 6,487,144 B2 | * | 11/2002 | Nagata et al. | 369/275.3 |
| 6,906,989 B2 | * | 6/2005 | Furuhashi | 369/53.17 |

* cited by examiner

*Primary Examiner*—Thang V Tran

(57) ABSTRACT

A method for writing data to an optical storage medium which includes a storage space with blocks having hardware addresses (HA). The storage space includes a pre-embossed area, and the data to be written includes data addresses (DA). Data having data addresses DA=X are stored in storage space blocks having hardware addresses HA=X$\Delta$, wherein $\Delta$ is an integer equal to 1 or more.

19 Claims, 2 Drawing Sheets

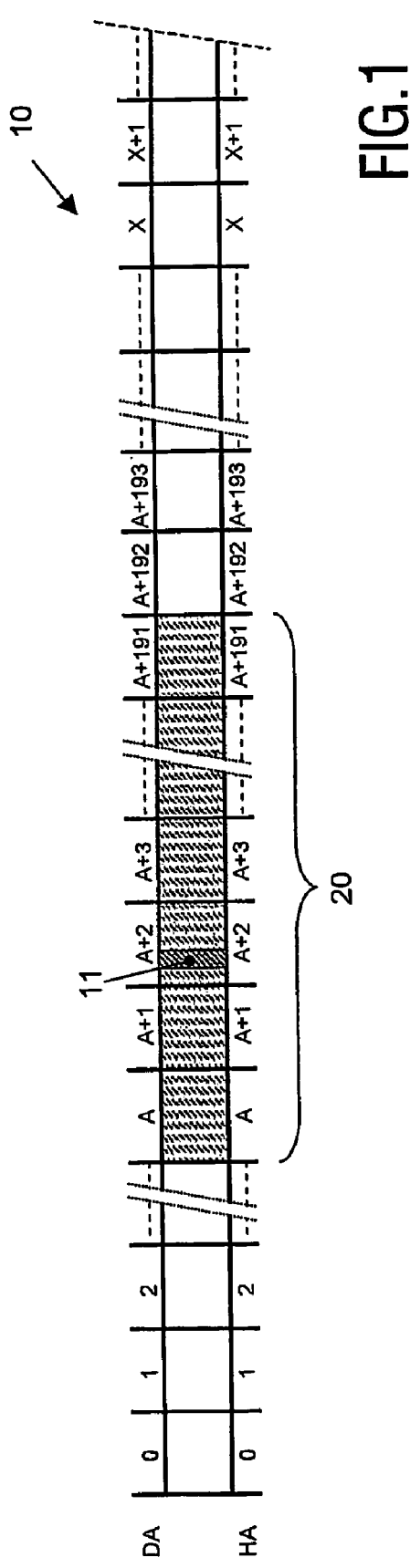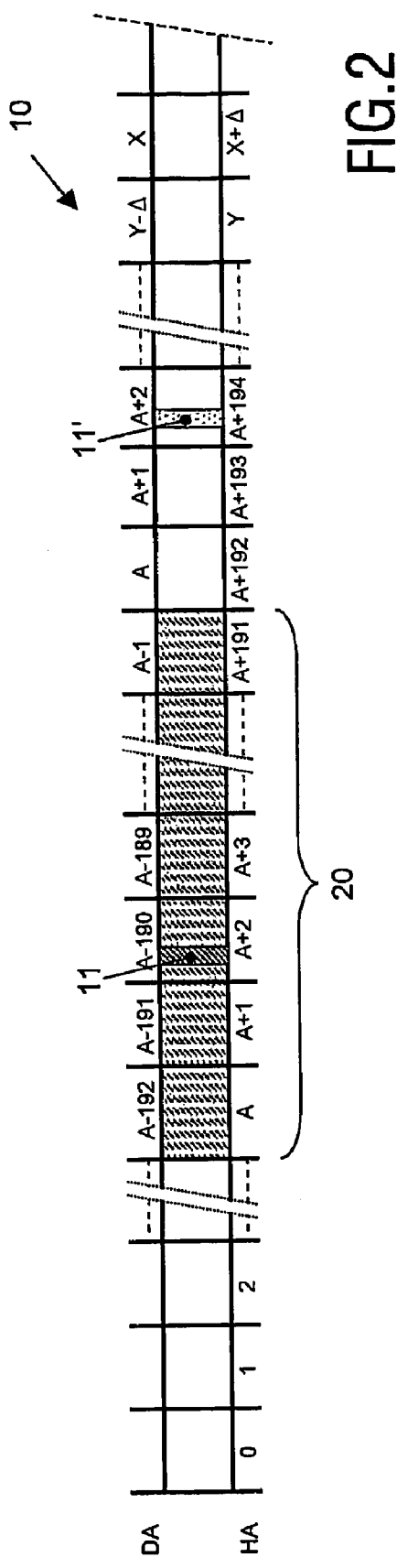

METHOD AND DEVICE FOR STORING INFORMATION

FIELD OF THE INVENTION

The present invention relates in general to a method and device for writing information to an optical storage medium which comprises a pre-embossed storage portion. Particularly, but not exclusively, the present invention relates to a method and device for writing information to an optical storage disc, more particularly a DVD-RW disc, and the present invention will be explained below with reference to this example.

BACKGROUND OF THE INVENTION

Optical storage discs are commonly known to those skilled in the art. Optical discs may be of the read-only type, where information is recorded during manufacture, which information can only be read by a user. Optical storage discs may also be of a writable type, where information may be stored by a user. Such discs may be a read-once type, indicated as writable (R), but there are also storage discs on which information can be written many times, indicated as rewritable MW). In the case of DVD, a distinction is made between two formats, i.e. DVD-RW and DVD+RW. Since the technology of optical discs in general, the way in which information can be stored in an optical disc, and the way in which optical data can be read from an optical disc are commonly known, it is not necessary here to describe this technology in more detail.

As is commonly known, memory space is divided into blocks, each block having an identification or address, such that a reading apparatus knows which block it is reading.

In the case of RW-type discs, the storage space is physically present in the form of a groove (+RW) or pre-pits (-RW), the blocks are predefined, and the addresses are already allocated and coded in physical hardware features of the storage space. A DVD-ROM reader is not equipped to read this physical coding, and is therefore not capable of reading these addresses. Therefore, in order to facilitate a DVD-ROM reader to read addresses, the addresses are also incorporated in the data to be written.

In the following, the addresses incorporated in physical hardware features of the disc, such as the groove wobble (+RW) or the pre-pits (-RW), will be indicated as hardware addresses, whereas the addresses incorporated in the written data will be indicated as data addresses. Normally, the values of these addresses are identical.

The memory space of a disc is subdivided in lead-in, main data, and lead-out areas. The lead-in area involves a group of blocks at the beginning of the disc, containing information relating to the disc itself. This information includes parameters like disc structure, book type (an indication of the standard used), and header byte, the header byte containing bits indicating area type (lead-in/main data, lead-out/middle data), a bit indicating whether the disc is read-only or not, and a bit indicating the reflectivity of the disc.

The present inventor has found that the playability of a disc depends on the values of said parameters. In this case playability can be defined as the degree to which a disc can be read by a disc drive with little or no errors. The playability is low in a case in which many errors are generated during playback.

The present invention aims to improve the playability of the storage medium. To this end, the present invention proposes to amend the values of said parameters such that the playability is increased, preferably such that the playability is maximal. In this respect, the present invention is based on the recognition that said parameters are for information purposes only, but do not actually change any setting of a disc drive.

DVD-RW type discs have a further problem in this respect, namely that the storage space portion where these parameters are stored is a pre-embossed area, i.e. an area which is not writeable. Of course, it is not possible to change the values of parameters stored in a non-writeable area.

It is an object of the present invention to provide a solution to this problem.

SUMMARY OF THE INVENTION

According to an important aspect of the present invention, the data addresses are not equal to the hardware addresses. In this respect, the present invention is based on the recognition that a reader apparatus, when reading a disc, only takes into account the data addresses and does not check whether or not the hardware addresses are identical to the data addresses.

Thus, according to the present invention, the data addresses corresponding to said parameters can be shifted to a rewriteable area, so that it is possible to change the values of the parameters as desired.

BRIEF DESCRIPTION OF THE DRAWINGS

These and other aspects, features, and advantages of the present invention will be further explained by the following description of the present invention with reference to the drawings, in which same reference numerals indicate same or similar parts, and in which:

FIG. 1 schematically illustrates the storage space of a disc;

FIG. 2 schematically illustrates the storage space of a disc in which the data shift method of the present invention has been incorporated;

DESCRIPTION OF TIE INVENTION

Figure 3A:
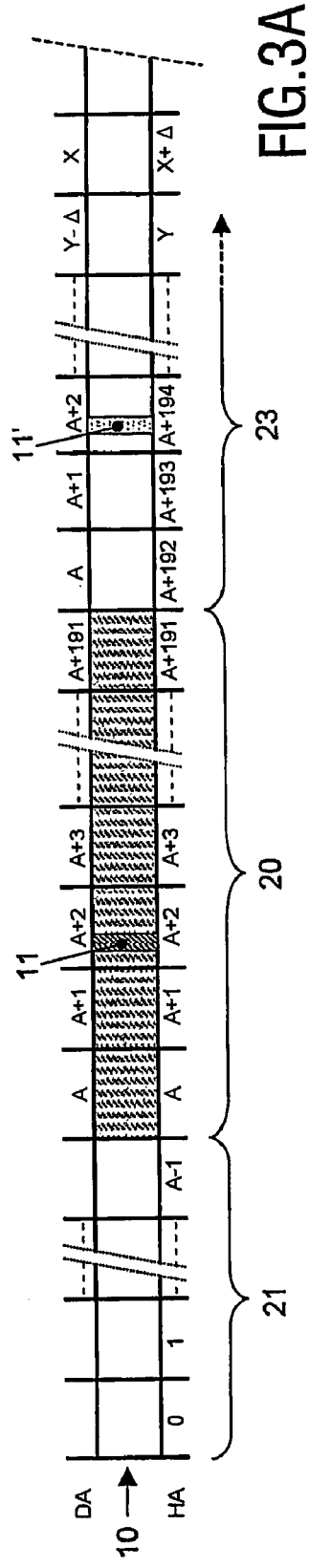
FIGS. 3A-C are Figures comparable to FIG. 2, illustrating details of different embodiments of the invention.

FIG. 1 schematically illustrates the storage space 10 of a DVD-RW disc as a continuous ribbon. Below the storage space 10, hardware addresses HA are indicated as consecutive numbers 0, 1, 2, etc. Above the storage space 10, data addresses DA are also indicated as consecutive numbers 0, 1, 2, etc. In this case, data addresses DA are identical to hardware addresses HA. Some of the addresses correspond to a pre-embossed area 20, which contains N blocks (ECC blocks). In the example of FIG. 1, said pre-embossed area 20 contains 192 blocks (N=192), as is the case in the DVD format. The addresses in this pre-embossed area 20 are indicated as ranging from a first address A to a last address A+192. In the case of DVD, these 192 blocks of the pre-embossed area 20 are mutually identical; however, this is not essential for implementing the present invention.

Said blocks of the pre-embossed area 20 contain at least one information byte with disc parameters, as was noted above. If the blocks of the pre-embossed area 20 are mutually identical, as is the case in DVD, each block of the pre-embossed area 20 contains such an information byte. However, for explaining the present invention, it suffices if only one block contains such an information byte, which is referenced 11 in FIG. 1. Therefore, only the block with address A+2 is shown to contain an information byte 11 by way of example in FIG. 1.

Normally data can be written in the blocks in any manner desired in the case of writeable storage media (R; RW). However, the pre-embossed area 20 is non-writeable, as is shown by the hatching of the storage portion of area 20. The information byte 11 is located in a block within said pre-embossed area 20, so its contents cannot be amended as desired.

FIG. 2 is a schematic drawing comparable to FIG. 1, for illustrating a storage space 10 in which the data shift method of the present invention has been incorporated. In this example, blocks having data addresses X are written into storage space blocks having hardware addresses X+Δ. Or, worded differently, data written in a storage space block having a hardware address Y has a data address Y−Δ. Thus, a shift of Δ blocks is achieved, Δ being one or more. In this example, Δ is chosen to be equal to N (=192).

It is noted that in FIG. 2, merely for sake of illustration, the data addresses having a lower address value than said data address A are shown with a successively decreasing value, i.e. A−1, A−2, . . . A−192. It should be realized, however that the blocks in the pre-embossed area 20 cannot have data addresses deviating from the hardware addresses, because the addresses of this storage area can not be changed.

The value of the shift parameter A is chosen such that the relevant information bytes obtain a storage location outside the pre-embossed area 20, i.e. in the rewritable portion of the storage space 10. In the example of FIG. 2, said information byte (denoted 11') is now written in a block having hardware address A+194, i.e. outside the pre-embossed area 20.

In some cases, it may be sufficient if Δ is smaller than N, as long as Δ is sufficiently great to ensure that one block-of-interest (DA=A+2) is shifted to a storage location (HA=A+194) outside said pre-embossed area 20. Preferably, the value of the shift parameter Δ is chosen such that all data addresses corresponding to hardware addresses within said pre-embossed area 20 are shifted to storage locations outside said pre-embossed area 20, i.e. Δ≧N. In the example of FIG. 2, Δ is equal to N, so that the first block within said pre-embossed area 20 (DA=A) is shifted to the block directly adjacent the last block within said pre-embossed area 20 (i.e. HA=A+192). However, it is preferred that some margin is created between the uppermost address of the pre-embossed area 20 (i.e. HA=A+191) and the new location of the lowermost address of the pre-embossed area 20 (i.e. DA=A); this margin preferably corresponds to a radial distance of the order of about 0.05 mm.

The present invention proposes three possible variations of the data shift method. In a first embodiment illustrated in FIG. 3A, the storage space portion 21 containing all addresses lower than the pre-embossed area 20 is ignored, i.e. no information is written in this portion. In FIG. 3A, this is illustrated by the fact that the blocks in this portion 21 have no data addresses. Furthermore, no information is written in said pre-embossed area 20 in this embodiment. In other words, information is only written into the storage space portion 23 containing addresses higher than the pre-embossed area 20 (i.e. HA>A+191). It is noted that FIG. 3A correctly shows that the data addresses DA are identical to the hardware addresses HA in the pre-embossed area 20.

Figure 3B:
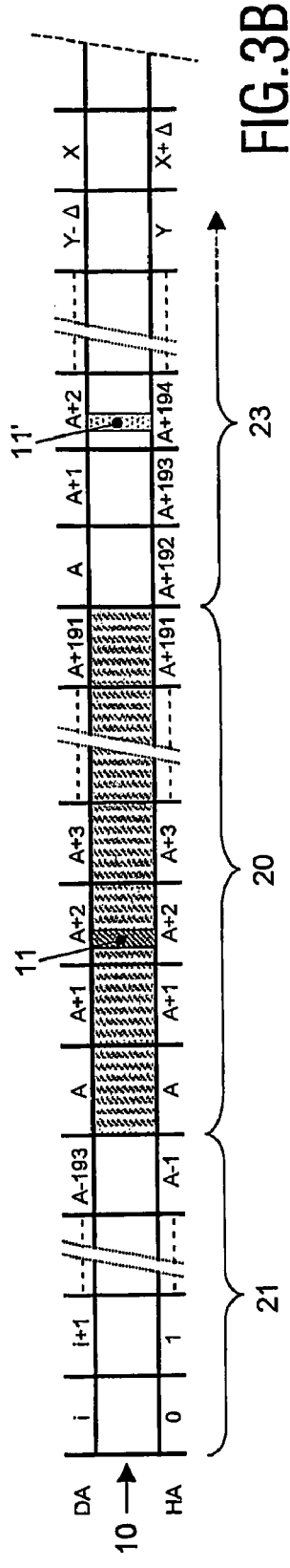

In a second embodiment illustrated in FIG. 3B, said portions 21 and 23 are written, but said pre-embossed area 20 is not written. Thus, in the example of FIG. 3B, -information can be written in blocks having hardware addresses HA<A. In FIG. 3B, this is illustrated by the fact that the blocks in this portion 21 have data addresses i, i+1, i+2, etc.

In the third embodiment illustrated in FIG. 3C, a write procedure is performed in respect of the pre-embossed area 20 as well as said areas 21 and 23 below and above the pre-embossed area 20. As in the second embodiment, information can now be written in the blocks having hardware address HA<A. However, the write process with respect to the pre-embossed area 20 will result in the data of the pre-embossed area 20 being destroyed, illustrated as a hatched portion in respect of the data addresses.

Figure 3C:
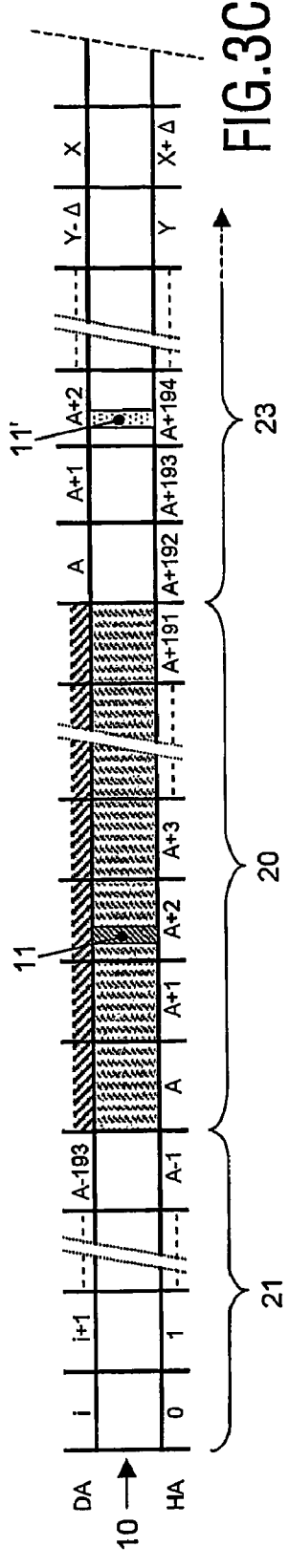

An advantage of the third embodiment of FIG. 3C is that the data-addressing of the storage space blocks is unambiguous. More particularly, it is effectively avoided that a read apparatus is capable of reading the pre-embossed area 20 at all. In the embodiments of FIGS. 3A and 3B, the data-addressing is not unambiguous. For instance, in the examples of FIGS. 3A and 3B, the block data address A+2 is present twice, once corresponding to HA=A+2 within the pre-embossed area 20, and a second time corresponding to HA=A+194 outside the pre-embossed area 20. Furthermore, in the example of FIG. 3B, block data address A−193 is present twice (HA=A−193 and HA=A−1), while there is an address discontinuity between HA=A−1 and HA=A (DA=A−193 and DA=A). In principle, a disc reader apparatus may consider such a situation to be an error situation which cannot be resolved.

Nevertheless, in all three embodiments illustrated in FIGS. 3A-C, disc reader apparatuses will be capable of reading the disc because they do not start at address 0 but they start at a certain radius which lies beyond the pre-embossed area 20. This radius is such that, even if tolerances are taken into account, an initial access of the disc reader apparatus is always beyond the pre-embossed area 20. For reading info byte 11, the disc reader will then approach the corresponding data address DA=A+2 from above, and will settle at data address DA=A+2 corresponding to hardware address HA=A+194, thus effectively reading byte 11' outside the pre-embossed area 20 instead of the original byte 11 inside the pre-embossed area 20.

A disc writing apparatus, when writing the data to storage space 10, especially when writing the information bytes 11' in data address DA=A+2, may select suitable values for the information bytes 11', deviating from the values of the original information bytes 11 in hardware address HA=A+2. The information bytes as written may have information values selected for optimum playability of the same apparatus during reading. These values may be stored in a memory of the drive and, when writing the data to storage space 10, the disc drive may read said values from this memory.

It is also possible that the disc is to be read by another apparatus, in which case the disc writing apparatus may be provided with input means for inputting user-determined values to be written as information bytes 11.

If the user does not know the optimum values for the read apparatus, it may be necessary to determine the optimum value through trial and error, i.e. by setting different values for the information bytes 11', each time determining the playability, and setting said disc information bytes 11' to those respective values which have been determined as providing the best playability.

It should be clear to those skilled in the art that the present invention is not limited to the exemplary embodiments discussed above, but that various variations and modifications are possible within the protective scope of the invention as defined in the appended claims.

While the invention has been explained by describing that the information of one single byte 11 in one block A+2 can be amended, it should be clear that the user may write any suitable data in the entire block A+2 for improving playability. Furthermore, although the present invention basically allows for different information to be written in the shifted blocks (i.e. HA=A+192 to HA=A+191+192), it is preferred that the same information is written in all of these blocks.

It is further to be understood that one or more of the functional aspects of the invention may be implemented in hardware, but it is also possible that one or more of these functional aspects are implemented in software.

The invention claimed is:

1. A method of writing data having data addresses incorporated in the data, the method comprising the acts of:
    providing an optical storage medium which comprises a storage space with blocks having block addresses HA allocated in physical features of the storage space, the storage space comprising a pre-embossed area;
    storing the data having data addresses DA in storage space blocks having block addresses HA that are shifted from the data addresses DA by $\Delta$ such that HA=DA+$\Delta$, wherein $\Delta$ is an integer at least equal to 1, wherein the data comprise at least one lead-in block comprising at least one byte which contains information relating to the optical storage medium, said at least one lead-in block having a data address DA corresponding to a block address HA within said pre-embossed area; and
    selecting $\Delta$ such that said at least one lead-in block is stored in a storage space block having a block address HA=DA+$\Delta$ outside said pre-embossed area.

2. The method according to claim 1, wherein the selecting act selects $\Delta$ such that a radial distance between a first block having a first block address of HA within said pre-embossed area and a second block having a second block address HA=DA+$\Delta$ outside said pre-embossed area is less than 0.2mm.

3. The method according to claim 1, wherein the selecting act selects $\Delta$ such that substantially all data blocks having data addresses of DA corresponding to block addresses of HA within said pre-embossed area are stored in storage space blocks having shifted block addresses of HA=DA+$\Delta$ outside said pre-embossed area.

4. The method according to claim 1, wherein the selecting act selects $\Delta$ such that the radial distance between a last block address within said pre-embossed area and a new location of a lowest address of the pre-embossed area is more than zero.

5. The method according to claim 1, further comprising the act of selecting the data to be written into a shifted version of a disc information byte such as to improve playability of the optical storage medium.

6. The method according to claim 1, further comprising the act of selecting the data to be written into an entire shifted version of said lead-in block such as to improve playability of the optical storage.

7. The method according to claim 5, further comprising the act of writing the same data into all blocks having data addresses DA corresponding to block addresses HA within said pre-embossed area.

8. The method according to claim 5, wherein a value of said disc information byte is inputted by a user.

9. The method according to claim 5, further comprising the acts of:
    selecting a first value for said disc information byte and writing it to disc;
    determining the playability of the optical storage medium with said disc information byte having its first value;
    selecting a second value for said disc information byte and writing it to the optical storage medium;
    determining the playability of the optical storage medium with said disc information byte having its second value;
    determining one value of said first and second values for said disc information byte that provides better playability; and
    setting said disc information byte to that one value which has been determined as providing the better playability.

10. The method according to claim 1, further comprising the act of writing information only into a storage space having block addresses HA higher than said pre-embossed area.

11. The method according to claim 1, further comprising the act of writing information only into a storage space having block addresses HA higher than said pre-embossed area and into a storage space having block addresses HA lower than said pre-embossed area.

12. The method according to claim 1, further comprising the act of writing information is into said pre-embossed area.

13. An optical storage medium comprising a storage space with blocks having block addresses HA, the storage space comprising a pre-embossed area;
    the storage medium containing data written in said storage space, the data comprising data addresses;
    wherein, at least in a portion of said storage space outside said pre-embossed area, a block having a block address HA contains data having data address DA shifted from the block address by $\Delta$ such that DA=HA−$\Delta$, wherein $\Delta$ is an integer equal to 1 or more, and wherein blocks having block addresses HA$\geq$A+192, where A is a first address, higher than said pre-embossed area, contain data having data addresses DA=Y−$\Delta$, while blocks having block addresses HA<A, lower than said pre-embossed area, contain no data.

14. An optical storage medium comprising a storage space with blocks having block addresses HA, the storage space comprising a pre-embossed area;
    the storage medium containing data written in said storage space, the data comprising data addresses DA;
    wherein, at least in a portion of said storage space outside said pre-embossed area, a block having a block address HA contains data having data address DA shifted from the block address HA by $\Delta$ such that DA=HA−$\Delta$, wherein $\Delta$ is an integer equal to 1 or more, and
    wherein blocks having block addresses HA$\geq$A+192, where A is a first address, higher than said pre-embossed area, contain data having data addresses DA=HA−$\Delta$, while blocks having block addresses HA<A, lower than said pre-embossed area, contain data having data addresses DA.

15. An optical storage medium comprising a storage space with blocks having block addresses HA, the storage space comprising a pre-embossed area;
    the storage medium containing data written in said storage space, the data comprising data addresses DA;
    wherein, at least in a portion of said storage space outside said pre-embossed area, a block having a block address HA contains data having data address DA shifted from the block address HA by $\Delta$ such that DA=HA−$\Delta$, wherein $\Delta$ is an integer equal to 1 or more, and
    wherein blocks having block addresses HA$\geq$A+19, where A is a first address, higher than said pre-embossed area, contain data having data addresses DA=HA−$\Delta$, while blocks having block addresses HA<A, lower than said pre-embossed area, also contain data having data addresses DA=HA−$\Delta$.

16. The optical storage medium according to claim 15, wherein the data of blocks within said pre-embossed area are destroyed.

17. An optical storage medium comprising a storage space with blocks having block addresses HA, the storage space comprising a pre-embossed area;
    the storage medium containing data written in said storage space, the data comprising data addresses DA;

wherein, at least in a portion of said storage space outside said pre-embossed area, a block having a block address HA contains data having data address DA shifted from the block address HA by $\Delta$ such that $DA=HA-\Delta$, wherein $\Delta$ is an integer equal to 1 or more, wherein the radial distance between a block having block address HA inside said pre-embossed area and the corresponding shifted block having data address DA outside said pre-embossed area is less than 0.2mm.

18. An optical storage medium comprising a storage space with blocks having block addresses HA, the storage space comprising a pre-embossed area;

the storage medium containing data written in said storage space, the data comprising data addresses DA;

wherein, at least in a portion of said storage space outside said pre-embossed area, a block having a block address HA contains data having data address DA shifted from the block address HA by $\Delta$ such that $DA=HA-\Delta$, wherein $\Delta$ is an integer equal to 1 or more, and wherein the radial distance between the last block within said pre-embossed area and the shifted block corresponding to the lowest address of the pre-embossed area is more than zero.

19. An optical storage medium comprising a storage space with blocks having block addresses HA, the storage space comprising a pre-embossed area;

the storage medium containing data written in said storage space, the data comprising data addresses DA;

wherein, at least in a portion of said storage space outside said pre-embossed area, a block having a block address HA contains data having data address DA shifted from the block address HA by $\Delta$ such that $DA=HA-\Delta$, wherein $\Delta$ is an integer equal to 1 or more, and wherein a block having block address HA within said pre-embossed area contains first data, and wherein a block having data address DA contains second data differing from said first data.

* * * * *